Patented Aug. 27, 1929.

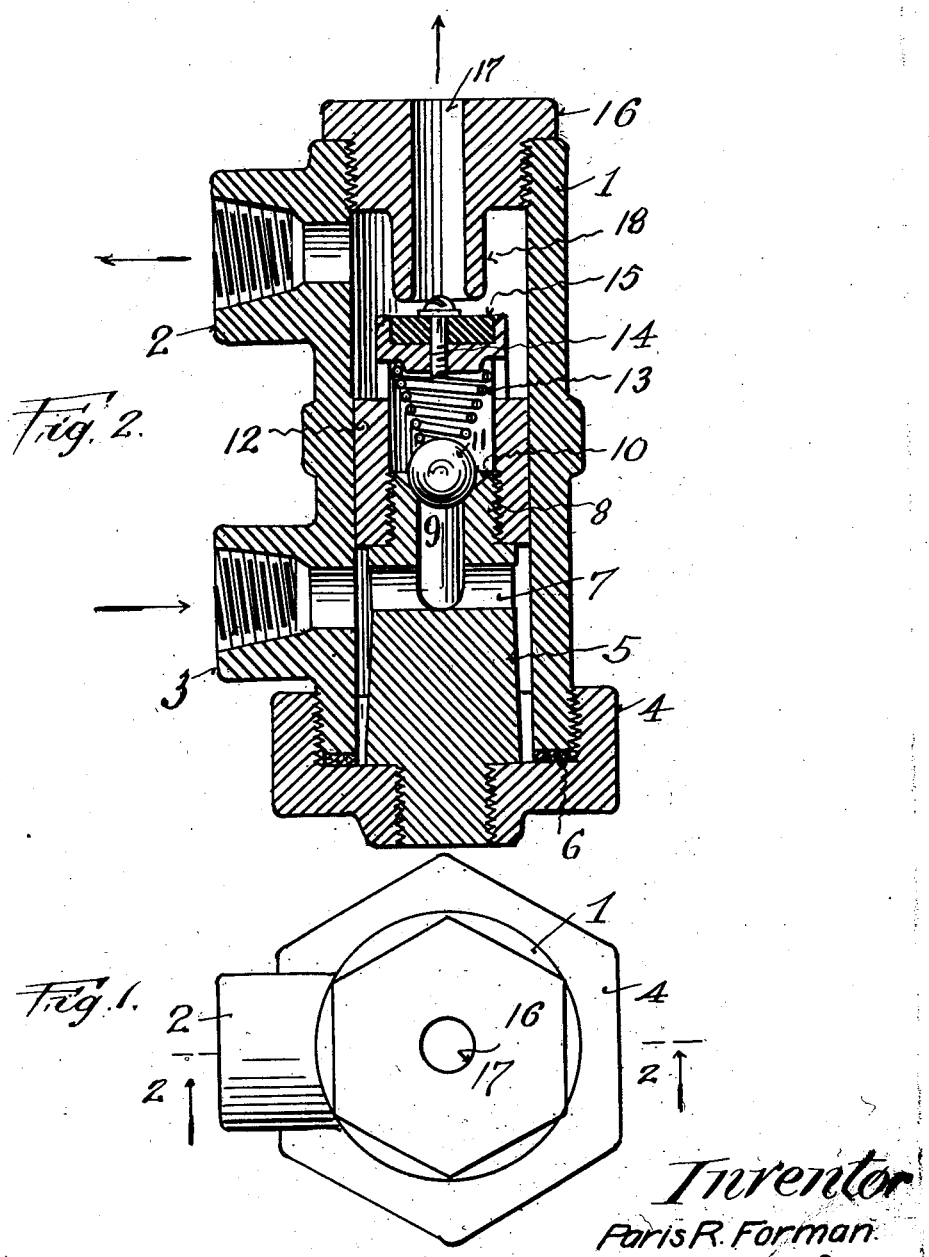

1,726,102

UNITED STATES PATENT OFFICE.

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA.

QUICK-RELEASE VALVE.

Application filed September 24, 1927. Serial No. 221,841.

This invention relates to a device arranged for permitting the rapid exhaust of fluid from fluid pressure operated devices.

One of the objects of this invention is the provision of a device to be inserted in the fluid pressure line of fluid operated devices to permit the flow of fluid from the source to the device while checking its return.

A further object of this invention is to provide in this device means which permits of the rapid exhaust of fluid from the fluid pressure operated device when the flow of fluid from the source is cut off.

A further object of this invention is the provision of a simple device for carrying out these functions and one which is relatively small in construction and arranged for rapid repairs.

These and other objects are secured by means of this invention.

This invention resides substantially in the construction, combination, arrangement and relative location of parts as will appear from the following disclosure.

Referring to the drawings,

Figure 1 is an end elevational view of the device from the exhaust port end, and Figure 2 is a cross-sectional view taken on the line 2—2 of Figure 1.

In the operation of fluid pressure devices it has been usual to provide some form of quick release valve which will automatically permit of the unobstructed application of fluid pressure to the fluid pressure operated device and which will automatically upon the disconnection of the device from the fluid source permit of the rapid exhaust of the fluid from the device. This invention contemplates a relatively simple arrangement for carrying out these operations.

Referring to the drawings, the valve is shown comprising a casing 1 internally threaded at one end and externally threaded at the other. Near the ends of the casing are the internally threaded projections 2 and 3 which provide passages into the casing. Screwed on to one end of the casing is a cap 4 which forms a fluid tight seal therewith in conjunction with the washer 6. An inwardly extending lug 5 is threaded to the cap 4. A small plunger or piston 12 forming a snug sliding fit with the interior of the casing is provided with a bore extending therethrough. Screwed into one end of the plunger is the member 8 having the passage 9 therethrough and provided with a U-shaped transversely extending passage as shown at 7. The inner end of the member 8 is provided with a conical seat 10 within which rests the ball 11. This arrangement provides a ball check valve which permits of the passage of fluid pressure through the plunger in one direction (that is upwardly in Figure 2) and prevents its return. In a recess in the outer face of the saddle and secured thereto by a machine screw 14 is a washer 15 forming a valve seat. Into the other end of the casing 1 fits a plug 16 which has an internal projection 18 for cooperation with the valve seat 15. A central bore 17 extends through the plug 16 and the projection 18.

The fluid line which extends from the source through a suitable control valve is threaded into the projection 3. The feed line to the fluid pressure operated device is screwed into the projection 2. When the control valve is operated to supply fluid pressure from the source the fluid flows into the casing through the projection 3 through passage 7 and into the space around plunger 12. This forces the plunger 12 forward so that the valve seat 15 presses against the projection 18 and closes the exhaust port 17. The fluid pressure then forces the ball 11 upwardly against the action of spring 13 and permits the fluid to flow past the plunger and out through projection 2 to the fluid operation device. When the control valve cuts off the supply of fluid from the source the back pressure in the feed line extending from projection 2 forces the plunger 12 and with it the valve seat 15 away from projection 18 and spring 13 seats the ball 11 on its seat 10. This opens the large exhaust port 17 and permits of the rapid exhaust of fluid from the fluid operated device. If necessary the control valve can be provided with a small exhaust port so that when the valve is shut off the pressure behind plunger 12 will be reduced to permit it to move backwardly and to permit the ball 11 to seat. From the foregoing disclosure the construction and operation of my device will be apparent to those skilled in the art.

I am aware that many changes in the detail of construction and relative association of parts will be apparent to those working in this art and I do not, therefore, wish to be limited to the exact disclosure shown for purposes of illustration but rather to the scope of my appended claims.

What I seek to secure by United States Letters Patent is:

1. In a quick release valve the combination with a casing having a smooth bore of constant diameter throughout the length of the casing, a closure for each end of the casing, one of said closures having an internal projection with a bore therethrough and a threaded projection near each end of the casing having a passage communicating with the interior of the casing of a plunger in said casing carrying a seat for closing the bore of said closure at its internally projecting end when fluid pressure is admitted to the casing through one of said threaded projections.

2. In a quick release valve the combination with a closed casing of uniform inner diameter having two fluid pressure ports and an exhaust port with an internally projecting rim of a plunger in said casing carrying a seat for sealing the lips of said exhaust port when fluid pressure is applied to one of said fluid pressure ports and ball check means for permitting fluid pressure to uni-directionally pass said plunger to the other of said fluid pressure ports.

3. In a quick release valve the combination with a closed casing of uniform inner diameter having two fluid pressure ports and an exhaust port with an internally projecting rim of a plunger in said casing, a seat on said plunger for closing said exhaust port in one position of said plunger and a ball check valve in said plunger arranged over a centrally disposed passage through said plunger to admit fluid pressure past said plunger when the seat on said plunger has sealed said exhaust port.

4. In a quick release valve the combination with a closed casing of uniform inner diameter having two fluid pressure ports and an exhaust port with an internally projecting rim of a plunger in said casing forming a snug sliding fit therewith, a seat on said plunger for sealing said exhaust port, said plunger having a centrally disposed passage therethrough, and a spring actuated ball check valve in said plunger and over said plunger passage for normally closing said passage in said plunger, said plunger moving to seal said exhaust port when fluid pressure is admitted behind said plunger through one of said fluid pressure ports and said ball check valve at the same time moving to uncover the passage in said plunger to admit fluid pressure to the other of said fluid pressure ports on the seating of said plunger carried seat.

5. In a quick release valve the combination with a closed casing of uniform inner diameter having two fluid pressure ports and an exhaust port with an internally projecting rim of a plunger in said casing, sealing means on said plunger for closing said exhaust port and check means on said plunger for admitting fluid pressure supplied behind said plunger from one of said fluid pressure ports to the other of said fluid pressure ports, said sealing means being adapted to uncover said exhaust port when the fluid pressure supply is cut off and said means on said plunger are closed, thereby causing the fluid pressure to escape through said exhaust port, while withholding any feeding of said pressure back into said fluid pressure supply.

In testimony whereof I have hereunto set my hand on this 19th day of September A. D., 1927.

PARIS R. FORMAN.